June 2, 1931.　　J. C. BERGNER　　1,807,820
COOKING APPARATUS
Original Filed Dec. 4, 1926　　6 Sheets-Sheet 6
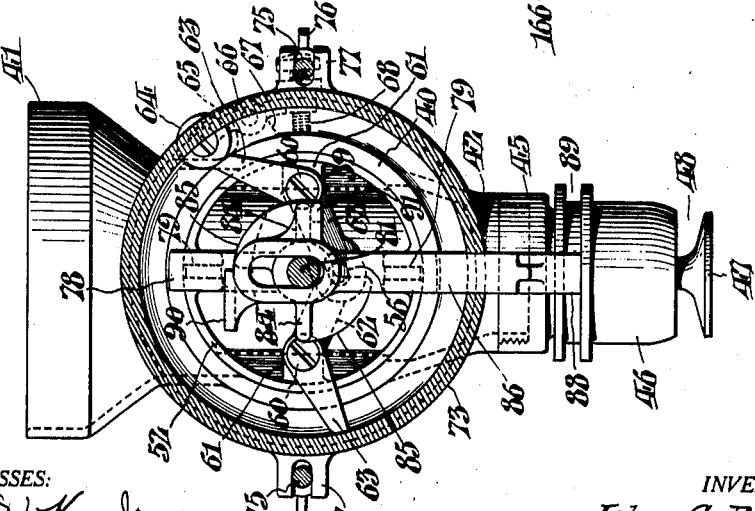
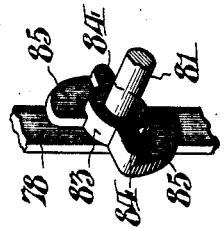
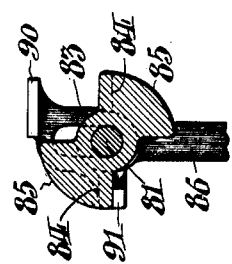
INVENTOR:
John C. Bergner

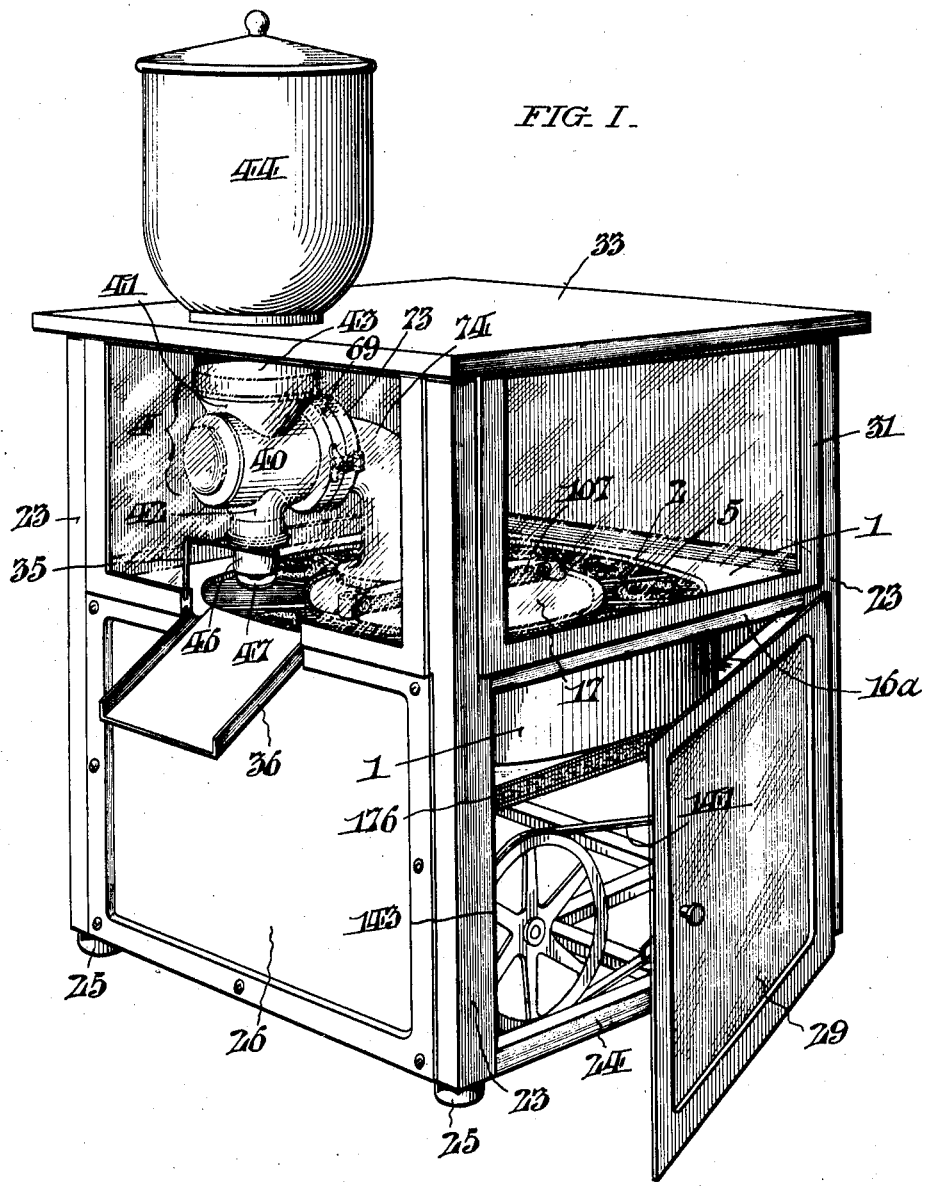

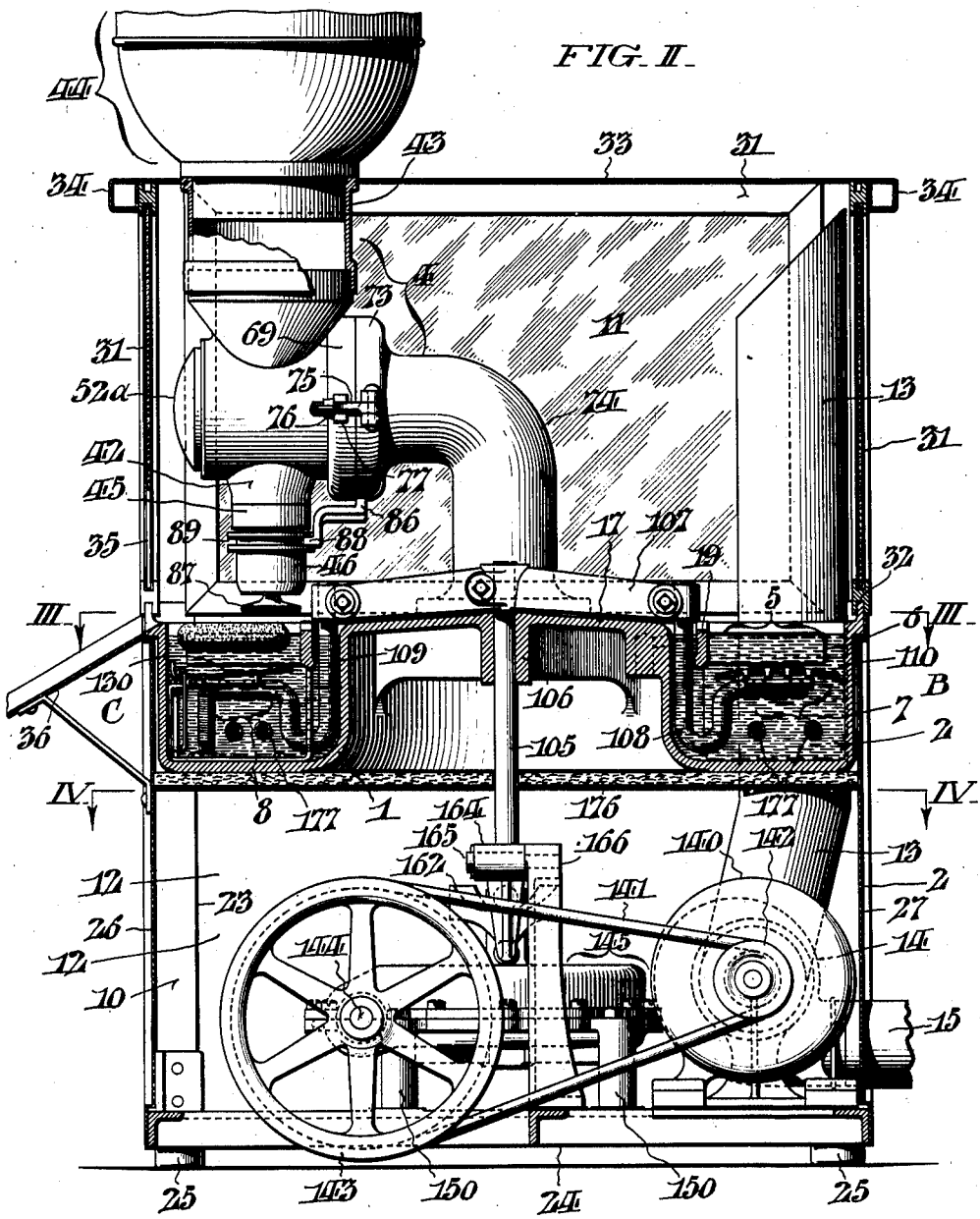

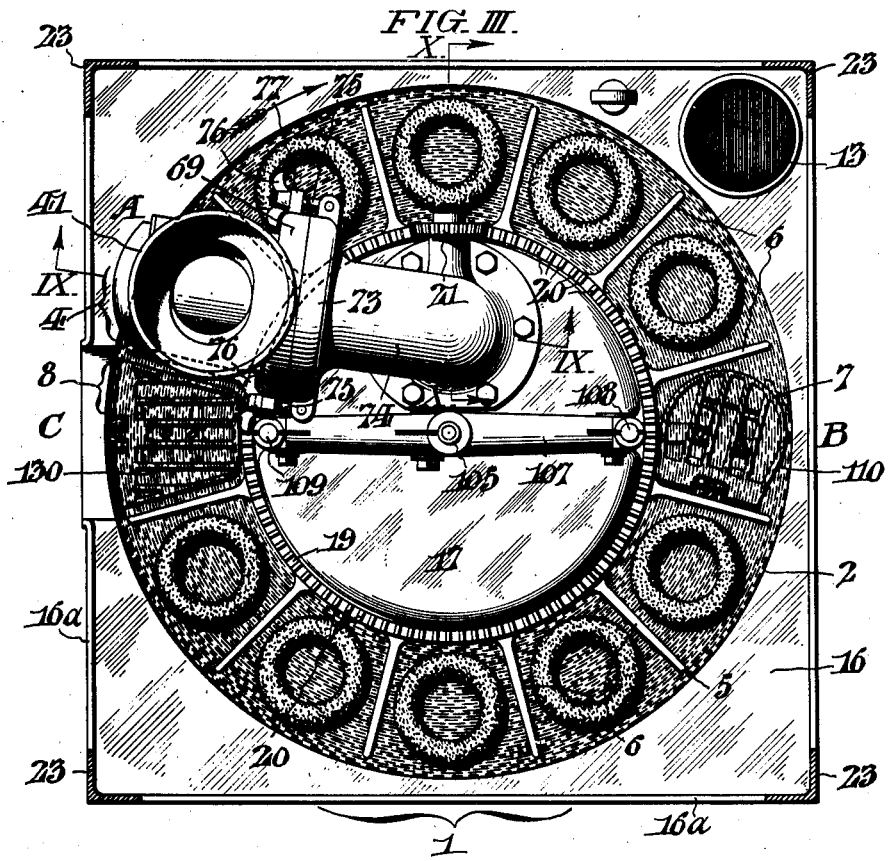
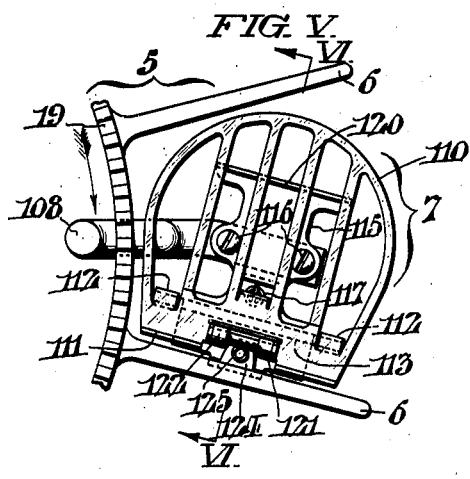
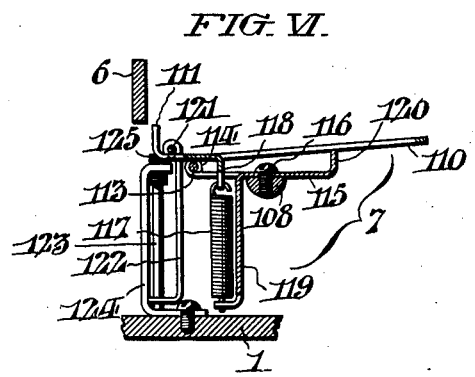

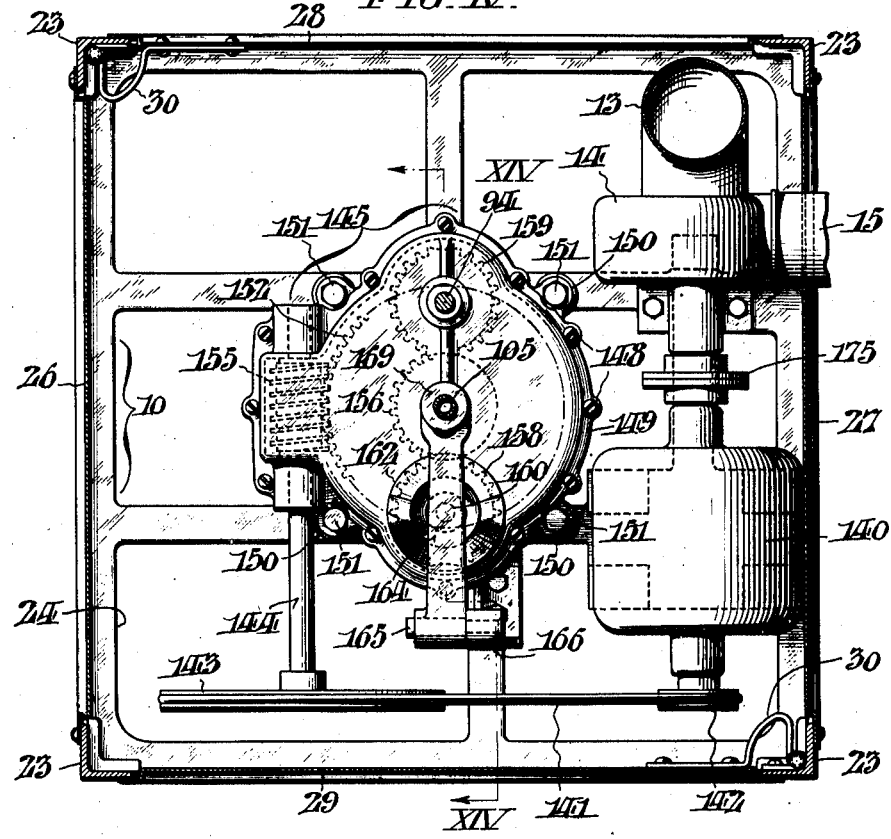

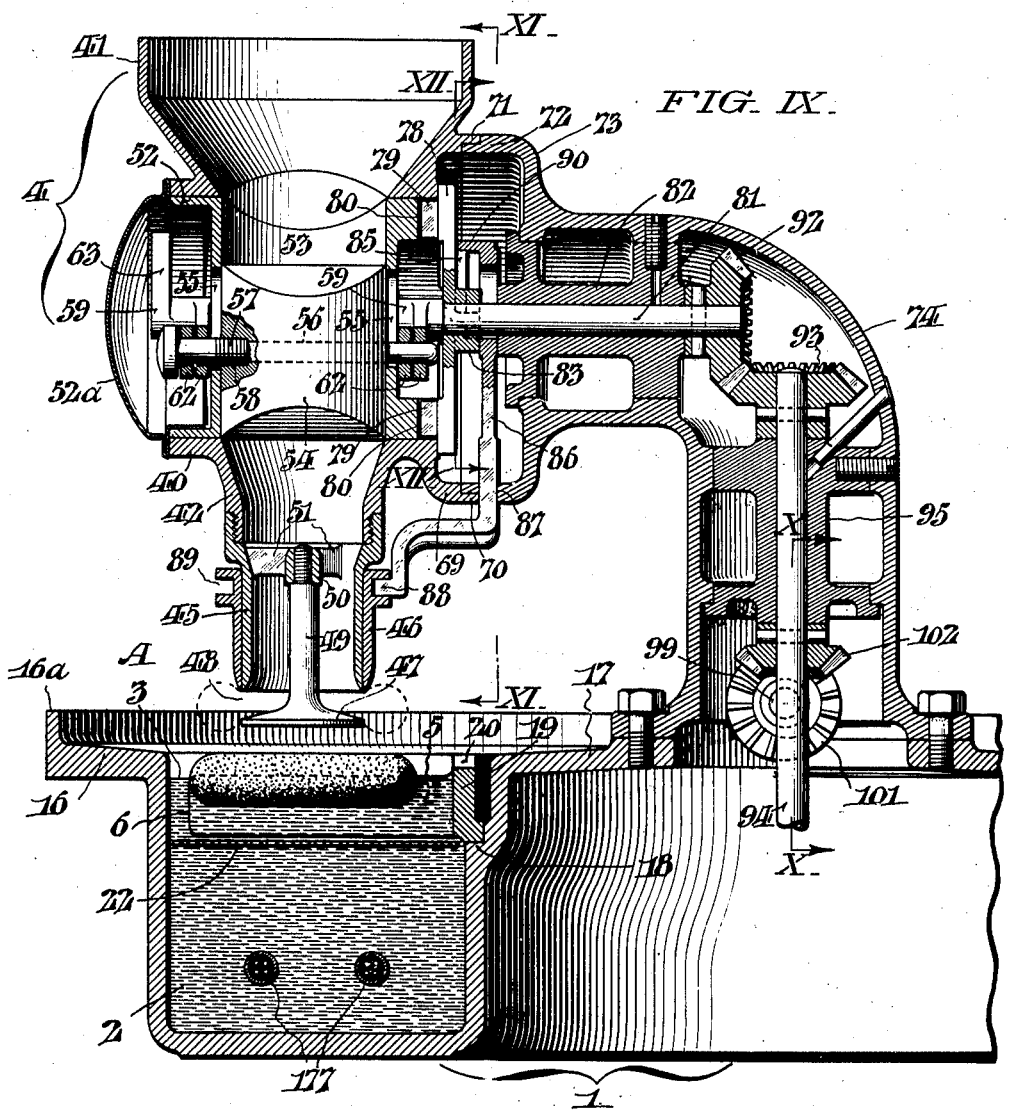
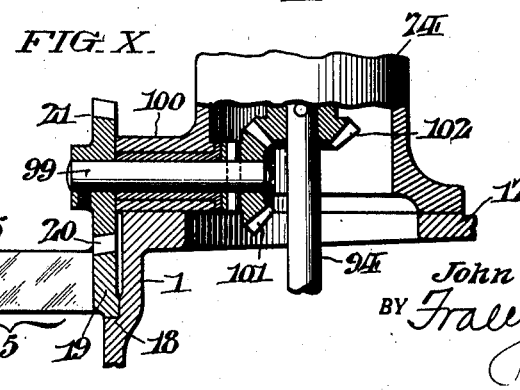

UNITED STATES PATENT OFFICE

JOHN C. BERGNER, OF LANSDOWNE, PENNSYLVANIA, ASSIGNOR TO DOUGHNUT MACHINE CORPORATION, OF NEW YORK, N. Y., A CORPORATION OF NEW YORK

COOKING APPARATUS

Continuation of application Serial No. 152,607, filed December 4, 1926. This application filed July 10, 1929.
Serial No. 377,536.

This invention relates to cooking apparatus in which hot liquor is employed as the cooking medium,—more particularly to apparatus of the kind shown and described in U. S. Patents, Nos. 1,492,541 and 1,492,542, granted me under date of April 29, 1922, for cooking articles such as doughnuts or crullers, this application being a continuation of an application Serial No. 152,607 filed by me on December 4, 1926.

In machines of this character, the articles (doughnuts) are automatically formed to annular configuration and released to drop horizontally into a circular receptacle containing hot cooking liquor wherein they are progressed over a circular path while afloat and maintained in definite separation, successively turned over incidentally to such progression, and finally ejected as a completely cooked product.

The aim of the present invention is to simplify machines of the type referred to for attainment of greater structural compactness, economy and ease in manufacture, and higher operative efficiency, as well as to retain the advantages resultant upon automatic operation, i. e., assurance of uniformity as to the size, shape, quality and color in the cooked product.

Other objects and attendant advantages of this invention will be manifest from the detailed description hereinafter when taken in connection with the drawings, whereof Fig. I is a perspective view of a cooking apparatus conveniently embodying my present improvement.

Fig. II is a vertical sectional view of the same.

Fig. III is a plan section taken as indicated by the arrows III—III in Fig. II.

Fig. IV is a plan section at a lower level in accordance with the arrows IV—IV in Fig. II.

Fig. V is a fragmentary plan view showing manipulating means whereby the articles being cooked are turned over incidentally to progression in the apparatus.

Fig. VI is a detail sectional view taken as indicated by the arrows VI—VI in Fig. V.

Fig. VII is a fragmentary view similar to Fig. V showing a plan view of manipulating means whereby the articles are ejected from the apparatus after cooking.

Fig. VIII is a sectional view taken as indicated by the arrows VIII—VIII in Fig. VII.

Fig. IX is a sectional view in accordance with the arrows IX—IX in Fig. III, showing the details of the means provided for automatically forming articles of annular configuration from the plastic or raw dough.

Fig. X is a detail section taken locally as indicated by the arrows X—X in Fig. IX.

Fig. XI is a sectional view of the forming means taken as indicated by the arrows XI—XI in Fig. IX.

Fig. XII is a sectional view taken locally in accordance with the arrows XII—XII in Fig. IX.

Fig. XIII is a fragmentary perspective view showing certain details of one of the parts associated with the forming means; and Fig. XIV is a sectional view taken as indicated by the arrows XIV—XIV in Fig. IV through the transmission unit from which the various sub-mechanisms of the apparatus derive motion.

With reference first more particularly to Figs. I, II, III and IX of the drawings, 1 designates a receptacle structure that affords an annular well or channel 2 to hold the cooking liquor,—the latter being maintained approximately at the level indicated at 3. The forming device comprehensively designated 4 is generally speaking of the type shown and described in my copending application, Serial No. 597,142, October 26, 1922. This forming device releases annular formations of plastic or dough to drop horizontally, at a station A (Fig. III), into the channel 2 about which said formations are progressed by an intermittently-moving means 5 in the form of a spider having radial vanes 6 that set apart a series of individual receiving cells whereby the articles are maintained in definite separation incidentally to being progressed as aforesaid. At a station B half way around the receptacle 1 from the station A, a manipulating means 7 functions to transfer each article from the pocket or cell initially occupied by it to the cell ahead in the direction of travel, incidentally inverting or turning such article over to insure cooking and browning of its other side during further progression in the channel. Upon traversing the remainder or final half of the channel 2, the cooked articles are successively presented at a station C directly adjacent the introducing station A where a manipulating means 8 lifts them individually from the liquor and ejects them laterally from the apparatus. The actuation of the forming means 4 is so timed with regard to the movement of the progressing means 5 and the manipulating means 7, 8, that a raw article is introduced into the receptacle for each one turned over and ejected. The receptacle 1 is supported by a skeleton frame structure comprehensively indicated by the numeral 10, the same being enclosed as hereinafter described to afford a cooking chamber 11 above the receptacle and a compartment 12 below for accommodation and housing of the driving machinery. The fumes rising from the hot liquor in the receptacle 1 are drawn off through a conduit 13 located in one corner of the chamber 11, said conduit extending down into the lower compartment 12 where it is connected to a suction blower 14 that discharges into an exhaust pipe 15 leading off to any convenient point of disposal.

With this brief introductory outline of the apparatus, I will now proceed to describe, in greater detail, the various parts which cooperate in effecting the several steps to which attention has been directed. From Fig. III it will be observed that the receptacle structure 1 is square in outline with provision of an extension or apron 16 beyond the annular channel 2, said apron being surrounded by an upstanding perimetric guard flange 16a and having its top surface sloping inwardly and downwardly to drain any splash of the cooking liquor back into said channel. The closed central concentric portion 17 of the receptacle structure 1 affords a narrow circumferential shoulder 18 (Fig. IX) which serves as a supporting ledge and bearing for the ring 19 of the radially-vaned progressing spider 5 previously referred to. The ring portion 19 of the spider 5 has gear teeth 20 intermeshing with a driving pinion 21 that is periodically rotated in a manner later on explained. At the station A where the raw articles are introduced into the receptacle by the forming device 4, I place beneath the progressing spider 5, a horizontal plate or diaphragm 22 which extends along the channel 2 to the extent of about three of the cells and prevents the raw formations (initially heavier than the cooking liquor) from sinking to the bottom of said channel until they become sufficiently buoyant to float.

The receptacle 1 is sustained at a convenient height, by vertical corner angle bars 23 constituting the uprights of the skeleton supporting structure 10 which is otherwise completed by a lower cross frame 24 that extends between said uprights at the bottom,—suitable means such as screws (not shown) being employed to rigidly secure these several parts together. The apparatus rests upon feet 25 formed as depending corner lugs of the cross frame 24 so that the latter is elevated somewhat above the surface supporting the same as shown in Fig. II. The machinery compartment 12 beneath the receptacle is closed in at the front and back by sheet metal panels 26, 27 that are appropriately stiffened through central offsetting or joggling as shown in Fig. II, and secured at their edge margins, by screws or other fastening devices, to the uprights 23 and the receptacle structure 1 as well as to opposite parallel rails of the lower cross frame 24. At the sides, the machinery compartment 12 is accessible through doors 28, 29 that are like the panels 26, 27 and hung, by hinges 30, to diagonally opposite uprights 23 as shown in Fig. IV, said hinges being concealed from view and their swinging leaves bowed (Fig. IV) so as to clear the uprights and permit full opening of the doors.

As shown in Figs. I and II, the angle uprights 23 extend above the receptacle 1 for capacity to function as guides for glazed sliding sashes 31 whose side and bottom rails are grooved as at 32 to engage the opposing flanges of adjacent uprights and to overlap the perimetric flange of said receptacle. The chamber 11 is closed at the top by a rectangular roof cover 33 fashioned from sheet metal with a perimetric bead 34 preferably of square configuration as shown in Fig. II, to fit after the manner of a lid over the top rails of the glazed sashes 31. This arrangement not only permits ready access to the receptacle, but provides an enclosure tight against egress of the fumes from the cooking liquor. The sash 31 at the front of the apparatus has an opening 35 through which the articles are ejected from the cooking chamber 11 and discharged upon a delivery chute 36 which directs them to a suitable receptacle, not shown, for collection.

The forming device 4, as delineated in Figs. IX and X, comprises a horizontal hollow cylindric body 40 with an integral flared inlet 41 at the top, and an axially aligned outlet 42 leading from its bottom. The inlet 41 is surmounted by a telescopically-fitting coupling neck 43 that extends upward through an opening in the top cover 33 of the cooking chamber 11 and in turn supports a removable exteriorly-located supply hopper or magazine 44 containing the plastic or dough from which the articles are to be formed. As a consequence of being located exteriorly of the cooking chamber in the manner shown, the magazine 44 is protected from the hot fumes rising from the cooking liquor and atmospheric air permitted to circulate entirely about it to the end that the dough is maintained fresh even through protracted idle periods of the machine. A detachable conduit extension 45 forms a continuation of the bottom outlet 42 of the device 4, and serves as a guide for a sleeve 46 with a sharpened lower edge. This sleeve 46 constitutes the movable element of the forming die and cooperates with a stationary disk 47 in severing the plastic or dough extruded through an annular opening 48 normally maintained between said disk and the lower end of the extension 45. The disk 47 has an axial stem 49 which is centralized within the conduit extension 45 and screwed into an integral boss 50 of the latter, said boss being supported by radial webs 51 with provision of semi-circular orifices permitting free downward passage of the plastic or dough. Disposed within the cylindric body 40 of the device 4 is a rotor 52 with a transverse bore 53 capable of registry with the inlet and outlet 42, and of affording guidance to a reciprocating displacement plunger 54. The end walls of the rotor 52 are slotted as at 55 for passage and protrusion of the opposite ends of a pin 56 that extends transversely through the plunger, said pin having a screw portion 57 which takes into a threaded counter-bore 58 in said plunger. The means for reciprocating the displacement plunger incidentally to the movement of the rotor 52, includes actuators 59 which are arranged in cooperative pairs at opposite ends of said rotor. These actuators are fulcrumed for free swinging movement about screws 60 let into lugs 61 at diametrically opposite points at the rotor ends, and have their contiguously disposed arms 62 overlapping and slotted to engage the projecting ends of the pin 56, see Fig. XI. In the operation of the forming device 4, the fingers 63 of the actuators 59 alternately contact with tappet rollers 64 (Fig. XI) which are so located that the plunger 54 is shifted at each semi-revolution of the rotor 52 to draw in a charge of the dough into the top of the bore 53 concurrently with displacement of a previously measured charge into the outlet 42 for expulsion through the annular die outlet 48. In order to enable varying of the throw of the displacement plunger 54 and thereby predetermine the size of the extrusions, the tappet rollers 64 are mounted on a fitting 65 that is fulcrumed on an axis 66 between projecting ears 67 of the casing 40, with capacity for adjustment by means of a set screw 68 engaging said casing. At the inner end, the cylindric casing 40 of the forming device 4 has an axial enlargement 69 whereof the projecting annular flange 70 is circumferentially recessed internally as at 71 to fit over the corresponding external recessed flange 72 of a hollow head 73 of a supporting elbow bracket 74 which is bolted to the top of the central portion 17 of the receptacle 1. The forming device 4 is removably secured to the elbow bracket 74 by means of swinging bolts 75 (Figs. I and XI) which are fulcrumed on the head 73 and equipped with wing nuts 76 to engage clevised lugs 77 on the flange 70. Within the protective enclosure jointly provided by the enlargement 69 and the head 73 operates a cross arm 78 with lateral lugs 79 which engage diametral notches 80 in the corresponding end of the rotor 52. This cross arm 78 is fast on a horizontal drive shaft 81 with journal support in a bearing piece 82 removably fitted into the upper end of the elbow bracket 74. The central boss 83 of the cross arm 78 has radial lugs 84 extending laterally from its opposite sides, each such lug being supplemented with a narrower segmental trailing fin 85. A cooperating vertical sliding bar 86 is slotted near the top for fitment over the shaft 81 and extends through a guide slot 87 jointly afforded by the parts 69 and 73 at the bottom. The lower end of the slide bar 86 is extended laterally as at 88 to engage a circumferential groove 89 in the cutter sleeve 46 previously referred to. At the upper end, the slide bar 86 has a pair of integral lateral projections affording oppositely directed ledges 90, 91 above and below the shaft 81. The upper ledge 90 is quite wide (Fig. XII) so as to be engaged by both the lugs 84 and the trailing fins 85; while the lower ledge 91 is much narrower and shorter so as to be engaged only by the lugs 84. Thus, incident to rotation of the cross arm 78, it will be seen that the radial lugs 84 alternately engage the ledges 90, 91 of the slide bar 86 so that the latter is alternately depressed and elevated to reciprocate the sleeve 46 and sever the extrusions from the die outlet. After passage of the radial lugs 84 beyond the projection 90, the trailing segmental fins 85 function to hold the slide rod 86 normally elevated to maintain the cutting sleeve 46 raised and the die outlet 48 open for extrusion of the plastic therethrough upon descent of the plunger 54 in the manner previously noted. For protection of the moving parts within the body 40 of the forming device, its outer end is closed in by a removable cover piece 52a that engages with a friction fit. It is to be particularly noted that upon removal of the magazine 44 and the coupling 43, the device 4 can be detached from the supporting elbow 74—simply by loosening the wing nuts 76 to release the swing bolts 75—and bodily withdrawn from the chamber 11 for inspection or cleaning, all the operative parts coming with it except for the cross arm 78 and the slide bar 86 which are retained by said elbow bracket 74. Furthermore, after withdrawal of the device 4, and removal of the cover piece 52a and the pin 56, the rotor 52 and its appendages, as well as the plunger 54, can be removed for individual handling in cleaning,—such disassembling requiring but a few moments in its accomplishment. Re-assembling is effected with like ease and without disturbing the timing of the forming device with relation to the other sub-mechanisms of the apparatus.

The drive shaft 81 for the forming device 4 derives motion through a pair of intermeshing bevel gears 92, 93 from a vertical shaft 94 that is journalled at the upper end in a removable bearing piece 95 within the vertical portion of the elbow bracket 74, said shaft extending downwardly into the machinery compartment 12 for coordination with drive mechanism to be presently described. The pinion 21 that actuates the progressing spider is secured to the end of a short shaft 99 (Figs. IX and X) that extends inwardly through a lateral bearing 100 in one side of the elbow bracket 74 to afford attachment of a bevel gear pinion 101 in mesh with a companion pinion 102 on the vertical shaft 94 already referred to.

The manipulating means 7, 8, for turning and ejecting the articles, are simultaneously actuated during the dwell periods of the progressing spider 5 through longitudinal movement of a vertical tubular slide rod 105 having guidance at its upper end in a central boss 106 of the receptacle structure 1. To this rod 105 is secured, at the top, a cross arm 107 whose opposite extremities reach to points adjacent the inner wall of the channel 2 where they clampingly engage brackets 108, 109 which directly support the manipulating devices 7, 8. In the present instance, these brackets 108, 109 are fashioned from stout bar stock with appropriate downward bends between their vertical and horizontal extremities to underreach and clear the ring portion 19 of the progressing spider 5 as the manipulating devices 7, 8 are lifted from a normal submerged position to a level above the spider vanes 6 in turning and ejecting the articles. While the manipulating devices are generally similar in construction, they differ in certain specific details and will therefore be separately described. Referring to Figs. V and VI, it will be noted that the turn-over device 7 embodies a grid 110 such as may conveniently be struck from sheet metal. Its configuration is substantially circular except at one side where it is straight and has an upturned flange 111 which is positioned so as to be aligned with the radial vanes 6 of the spider 5 when the latter is at rest. Spaced downturned curls 112 of the grid 110 engage a hinge pintle 113 which is parallel to the flange 111 and supported in upturned curls 114 of a plate 115 that is secured to the flattened horizontal portion of the bracket 108, see Fig. VI, with its free end resting upon a vertical stop flange 120 of said plate. Pivotally hung from a pintle 121 on the grid 110 somewhat to the rear of the hinge axis 113, is a hook 122 that has its laterally directed lower end apertured to engage a vertical guide rod 123, the latter being sustained by a support 124 screwed fast in the channel 2. The upper end of the rod 123 is engaged within a tubular stop screw 125 capable of adjustment relative to the support. Thus as the bracket 108 is elevated, the article at the time afloat in the cooking liquor over the grid 110, is first lifted to a level above the spider 5, and later, when the hook encounters the stop screw 125, said grid is suddenly swung on its hinge axis 113 and the article turned over by rapid flapping movement incidentally to transfer over the top of the spider vane 6 into the next cell ahead in the direction of progression.

The grid 130 (Figs. VII and VIII) of the ejecting means 8 differs in shape from the grid 110 of the manipulating means 7, that is to say, it conforms more nearly to the configuration of the cells set apart in the channel 2 by the spider vanes 6. It is hinged at 131, for swinging movement laterally of the progressing spider 5, to a supporting plate 132 secured to the horizontal extremity of the bracket 109 in a manner similar to that described of the supporting plate 115 in connection with the manipulating device 7. Here again a hook 133 is employed to swing the grid 130, said hook having engagement with a guide rod 134 and being operable by an adjustable stop screw 135 in a support 136 secured in the channel 2. In this instance the support 136 lies crosswise of the channel 2 and has its inner end 137 upturned and bifurcated to guide the bracket 109, thereby preventing disalignment of both manipulating devices 7, 8 relative to the spider vanes 6.

The machinery for driving the various instrumentalities and devices hereinbefore described is concealed in the lower compartment 12 of the machine, and, as shown in Figs. II and IV, includes an electric motor 140 which rests on the lower frame 24. Motion is transmitted at reduced speed by a belt 141 from a pulley 142 on the shaft of the motor, to a sheave 143 on the projecting end of the drive shaft 144 of a transmission unit 145 supported at the center of the frame 24. The casing of this unit 145 is substantially circular and comprises upper and lower halves 146, 147 which are secured together by screws 148 engaging through complemental abutting flanges 149. The lower casing section 147 has tubular legs 150 to accommodate securing bolts 151 that take into bosses of the frame 24. Within the hollow of the casing 146, 147 a worm gear 152 is mounted for free rotation about an axial stud 153 secured in the central boss 154 of the lower section 147. This gear meshes with a driving worm 155 on the shaft 144, and is thus driven at greatly reduced speed. Surmounting the worm gear 152 is a spur gear 156, the same being made fast by screws 157 so as to rotate with said worm gear. From Fig. IV it will be observed that the spur gear 156 is mutilated, that is to say, it has teeth extending only part way around its circumference for capacity to alternately drive associated intermittent gears 158, 159 at opposite sides thereof. The gear 158 is secured to the lower end of a stub shaft 160 which protrudes through a bearing boss 161 on the upper casing section 146 to afford attachment for a crown cam 162 with circumferential rises 163. An arm 164 fulcrumed at 165 to a bracket 166 upstanding from the lower machine frame 24, carries rollers 167, 168 which respectively engage the upper and lower edges of the crown cam 162, so that as the latter rotates, up and down movement is communicated to said arm. The outer end of this arm 164 is clevised to engage between the flanges of a collar 169 that has adjustable screw threaded engagement with the tubular actuating rod 105 for the manipulating means 7, 8. Guidance, in addition to that provided by the central hub 106 of the receptacle structure 1, is accorded the tubular rod 105 by a vertical stud pin 170 secured in a central lug of the casing section 146 of the transmission unit 145. The other intermittent gear 159 is secured to the lower end of a sleeve 171 which is journalled in a bearing 172 at the side of the upper casing section 146 opposite to that occupied by the crown cam 162. Within its hollow, the sleeve 171 receives the lower end of the shaft 94 which is coordinated with the forming device 4,—a transverse pin 173 serving to secure the shaft to the sleeve. In operation of the transmission 145, it will be apparent that since the mutilated gear 156 is constantly rotated by the worm gear 152, the cooperating intermittent gears 158, 159 will be successively driven—each through a semi-rotation—thereby determining, through the various interposed instrumentalities already described, step-wise progression of the spider 5 and actuation of the forming means 4 in alternation with actuation of the manipulating means 6, 7 so that for each raw article formed and released by said forming means at station A, another is turned at the station B, and still another ejected at the station C.

By preference, the blower 14 that draws the fumes from the cooking chamber 11 above the receptacle 1, is driven direct by the motor 140 through a coupling connection shown at 175 in Fig. IV. A horizontal diaphragm 176 of asbestos or other suitable thermo-insulating material is placed immediately beneath the receptacle structure 1 to protect the machinery in the compartment 12 from the heat of the cooking liquor. Said liquor may be heated in any convenient manner, for example, by electric coils protected within metallic tubes 177 submerged in the liquor.

From the foregoing it will be apparent that my improved cooking apparatus is unique by virtue of the ease with which it can be assembled. For example, the transmission 145 —previously assembled as a unit—as well as the motor 140, the blower 14 and the fulcrum bracket 166 are first bolted in place on the frame 24; the uprights 23 next screwed fast to the corners of said frame; the receptacle 1 thereupon attached to said uprights; the elbow bracket 74 mounted and the shaft 94 incidentally connected to the transmission; and the slide rod 105 carrying the manipulating devices 7, 8 finally inserted through the central boss 106 of the receptacle and coupled with its actuating arm 164. With these things accomplished, all that remains to be done is to apply the panels 26, 27, the doors 28, 29, the sashes 31 and the cover 33 to the machine skeleton; and to attach the forming device 4 and mount the dough magazine 44 thereon.

Having thus described my invention, I claim:

1. In apparatus for cooking articles such as doughnuts with hot liquor, the combination of a circular receptacle to hold the liquor, means for progressing the articles afloat and definitely separated one from another in the liquor over a single circular path, means for introducing the articles at the beginning of the path, means for turning over the articles at an intermediate point in the path, and means for subsequently ejecting the articles from the apparatus.

2. In apparatus for cooking articles such as doughnuts with hot liquor, the combination of a circular receptacle for the liquor, means for progressing the articles afloat and definitely separated one from another in the liquor over a single circular path, means for introducing the articles at the beginning of the path, and means at an intermediate point in the path for turning over the articles forwardly in the direction of travel.

3. In apparatus for cooking articles such as doughnuts with hot liquor, the combination of a circular receptacle to hold the liquor, means for progressing the articles afloat and definitely separated one from another in the liquor over a single circular path, means for introducing the articles at the beginning of the path, means at an intermediate point in the path for turning over the articles forwardly in the direction of travel, and means at the end of the path to eject the articles laterally from the machine.

4. In apparatus for cooking articles such as doughnuts afloat in hot cooking liquor, the combination of a single annular series of cells for maintaining a multiplicity of the articles definitely separated in the liquor, and means for transferring the articles succesively from one cell to another in the series.

5. In apparatus for cooking articles such as doughnuts afloat in hot cooking liquor, the combination of a single annular series of cells for maintaining a multiplicity of articles definitely separated in the liquor, means for individually transferring the articles from one cell to the next succeeding cell in the series.

6. In apparatus for cooking articles such as doughnuts afloat in hot cooking liquor, the combination of a single annular series of cells for maintaining a multiplicity of the articles definitely separated in the liquor, and means for turning the articles over incidentally to transfer from one cell to another in the series.

7. In apparatus for cooking articles such as doughnuts afloat in hot cooking liquor, the combination of a circular receptacle to hold the cooking liquor, intermitently rotating progressing means affording a single circular series of cells for maintaining a multiplicity of the articles definitely separated in the liquor, a station at which the articles are successively introduced into the cells, a station where the articles are turned over incidentally to transfer from one cell to another in the series and a station at which the articles are ejected from the cells successively, and means for actuating said progressing means in alternation with the turning and ejecting means.

8. In apparatus for cooking articles such as doughnuts afloat in hot cooking liquor, the combination of a circular receptacle to hold the cooking liquor, an intermittently rotatble progressing means affording a single circular series of cells for maintaining a multiplicity of the articles definitely separated in the liquor, a station at which the articles are successively introduced into said cells, a station at which the articles are successively turned over incidentally to transfer from one cell to the next in the series, a station at which the articles are ejected from the apparatus, and a transmission for actuating the means at the several stations such that an article is turned over and another ejected for each one introduced.

9. In apparatus for cooking articles such as doughnuts afloat in hot cooking liquor, the combination of a receptacle structure with an annular channel to hold the cooking liquor, a rotating progressing means setting apart a single series of cells in the channel to maintain a multiplicity of the articles definitely separated in the liquor, means for introducing the articles successively into the cells at a receiving station, a station substantially diametrically opposite the receiving station at which the articles are successively turned incidentally to transfer from one cell to the next cell in the direction of progression, and means adjacent the receiving station for ejecting the articles from the apparatus.

10. A cooking apparatus comprising a receptacle structure with an annular channel to hold cooking liquor, and means setting apart in the channel a single circular series of cells in which the articles being cooked are maintained in definite separation incidentally to being progressed in the cooking liquor.

11. A cooking apparatus comprising a receptacle structure with an annular channel to hold the cooking liquor, means for progressing the articles being cooked about the channel, said means having the form of a spider with a ring supported for rotation about the inner wall of the channel aforesaid and radial vanes to set apart individual cells for the articles, and a gear pinion in mesh with teeth on the ring of the spider to rotate the latter for progression of the articles in the channel.

12. A cooking apparatus comprising a receptacle structure with an annular channel to hold the cooking liquor, means for progressing the articles being cooked about the channel, said means having the form of a spider with a ring supported for rotation about the inner wall of the channel aforesaid and radial vanes to set apart individual cells for the articles, a gear pinion in mesh with teeth on the ring of the spider, and connections extending down through the receptacle structure to drive means beneath for periodically rotating the gear pinion to intermittently shift the spider.

13. A cooking apparatus comprising a rectangular receptacle structure to hold cooking liquor, uprights at the corners of said receptacle structure, sashes slidably engaging the uprights, and a removable cover engaging over the tops of the sashes to form an enclosure over the receptacle structure.

14. A cooking apparatus comprising a rectangular receptacle structure supporting corner uprights extending above and below said receptacle structure, a cross frame uniting the uprights at the bottom, separable panels enclosing the space beneath the receptacle structure to provide a protective compartment for driving machinery, said panels being attached to the receptacle structure, the bottom frame and the uprights, sashes slidable on the uprights above the receptacle structure, and a cover engaging over the sashes to form an enclosed cooking chamber above the receptacle structure.

15. An apparatus for cooking articles such as doughnuts comprising a receptacle structure to hold cooking liquor, a hollow bracket rising from said receptacle structure to support a device for forming and releasing the articles to drop into the cooking liquor, and actuating connections for the forming means extending through the hollow bracket for coordination with driving means beneath the receptacle structure.

16. An apparatus for cooking articles such as doughnuts comprising a receptacle structure with a closed central portion and an annular channel to hold cooking liquor, a hollow elbow bracket rising from the central portion of the receptacle structure to support a forming device over the channel to release the articles to drop into the liquor, and actuating connections for the forming device extending inward and downward through the hollow elbow bracket for coordination with driving means beneath the receptacle.

17. An apparatus for cooking articles such as doughnuts comprising a receptacle structure to hold cooking liquor, a hollow bracket rising from the receptacle structure to support, with capacity for bodily removal, a rotary device for forming and releasing the articles to drop into the cooking liquor, and actuating means for the forming device within the hollow bracket including a shaft with a cross arm to releasably engage slots in the end of the rotor of said forming device, and means beneath the receptacle structure for driving the shaft aforesaid.

18. A cooking apparatus comprising a receptacle structure to hold cooking liquor, means for successively releasing the articles to be cooked to drop into the cooking liquor, means to progress the articles in the liquor, manipulating means to turn the articles over incidentally to such progression and to subsequently eject them from the apparatus, and a transmission common to the releasing, progressing and manipulating means having parts enclosed in a single casing separable as a unit from the machine.

19. A cooking apparatus comprising a receptacle structure to hold cooking liquor, means for successively releasing the articles to be cooked to drop into the receptacle, concurrently operative means to intermittently progress the articles in the liquor, manipulating means operative in alternation with the releasing and progressing means to turn the articles over at an intermediate stage of the cooking and to subsequently eject them from the apparatus, and a common transmission to actuate the releasing, progressing and manipulating means in the manner described, said transmission having parts enclosed in a single casing separable as a unit from the machine.

20. Apparatus for cooking articles such as doughnuts comprising a receptacle structure with an annular channel to hold cooking liquor, intermittently-operative rotary means for individually forming and releasing the articles to drop into the receptacle, intermittent rotating means to progress the articles about the channel, manipulating means operative in alternation with the forming means and the progressing means through reciprocation of an actuator to turn the articles over at an intermediate stage of the cooking and to subsequently eject them from the apparatus, a transmission including a mutilated drive gear and a pair of intermittent gears adapted to be alternately driven by said drive gear, a shaft directly connected to one of the intermittent gears for driving the forming and progressing means, a rotary cam revolving with the other of said intermittent gears, and means cooperative with the cam to impart reciprocatory movement to the actuator for the manipulating means aforesaid.

21. A cooking apparatus comprising a receptacle structure to hold cooking liquor, means for successively releasing the articles to be cooked to drop into the cooking liquor, means to progress the articles in the liquor, manipulating means to turn the articles over incidentally to such progression and to subsequently eject them from the apparatus, a transmission beneath the receptacle structure with parts enclosed in a single casing separable as a unit from the machine, and drive connections for the releasing, progressing, and manipulating means aforesaid extending down through the receptacle structure for actuation by the transmission.

22. A cooking apparatus comprising a receptacle structure with an annular channel to hold cooking liquor, means to progress the articles being cooked about the channel, manipulating means at substantially opposite points in the channel respectively for turning over the articles at an intermediate stage of the cooking and subsequently ejecting them from the apparatus, an actuating rod having guidance for vertical movement in an axial boss of the receptacle structure, a cross arm on said rod with oppositely-reaching extremities to support the manipulating means aforesaid, and means to impart reciprocatory movement to the rod for simultaneous actuation of the manipulating means.

23. A cooking apparatus comprising a receptacle structure with an annular channel to hold cooking liquor, means to progress the articles being cooked about the channel, manipulating means at substantially opposite points in the channel respectively for turning over the articles at an intermediate stage of the cooking and subsequently ejecting them from the apparatus, an actuating rod extending downward through an axial boss of the receptacle structure, a cross arm on said rod with oppositely-reaching extremities to support the manipulating means aforesaid, and means beneath the receptacle to impart reciprocating movement to the rod for simultaneous actuation of the manipulating means.

24. Apparatus for cooking articles such as doughnuts comprising a receptacle to hold hot cooking liquor, an enclosure over the receptacle, forming means within the closure for releasing raw doughnuts to drop into the cooking liquor, said forming means having its dough magazine located exteriorly of the enclosure with provision for circulation of atmospheric air entirely thereabout.

In testimony whereof, I have hereunto signed my name at Philadelphia, Pennsylvania, this tenth day of July, 1929.

JOHN C. BERGNER.